United States Patent
Gorenstein

(10) Patent No.: US 8,244,624 B2
(45) Date of Patent: Aug. 14, 2012

(54) ESTABLISHING STANDARDIZED DIAMOND PROFILES AND PRICING

(76) Inventor: Ran Gorenstein, Antwerp (BE)

(*) Notice: Subject to any disclaimer, the term of this patent is extended or adjusted under 35 U.S.C. 154(b) by 874 days.

(21) Appl. No.: 12/173,250

(22) Filed: Jul. 15, 2008

(65) Prior Publication Data

US 2010/0017258 A1    Jan. 21, 2010

(51) Int. Cl.
*G06Q 40/00* (2012.01)
(52) U.S. Cl. ........................ 705/37; 705/36 R
(58) Field of Classification Search .......... None
See application file for complete search history.

(56) References Cited

U.S. PATENT DOCUMENTS

| | | | |
|---|---|---|---|
| 4,508,449 A | 4/1985 | Okazaki | |
| 5,950,178 A | 9/1999 | Borgato | |
| 6,980,283 B1* | 12/2005 | Aggarwal | 356/30 |
| 2003/0065586 A1 | 4/2003 | Shaftel | |
| 2003/0115079 A1 | 6/2003 | Rapaport | |
| 2003/0115131 A1 | 6/2003 | Heaton et al. | |
| 2006/0265310 A1* | 11/2006 | Cohen et al. | 705/37 |
| 2007/0036921 A1 | 2/2007 | Twitchen | |
| 2007/0203855 A1* | 8/2007 | Fisher | 705/36 R |
| 2008/0177675 A1* | 7/2008 | Arginteanu | 705/36 R |
| 2010/0042531 A1 | 2/2010 | Heaton | |
| 2010/0100460 A1* | 4/2010 | Aronson | 705/27 |
| 2010/0121755 A1* | 5/2010 | Spurgin et al. | 705/37 |

OTHER PUBLICATIONS

"The Economics of Diamond Price Movements", Ariovich G.; Managerial and Decision Economics; Dec. 1985; vol. 6 is. 4.*
"Markets Continuity and Change in the International Diamond Market", Spar, Debora L., Journal of Economics Perspectives. vol. 20 No. 3, Summer 2006, pp. 195-208.*

* cited by examiner

*Primary Examiner* — M. Thein
(74) *Attorney, Agent, or Firm* — Hancock Hughey LLP

(57) ABSTRACT

A method and system for establishing an index useful for pricing diamonds in a standardized way that thus makes diamonds amenable for derivative trading via futures contracts or the like.

18 Claims, 1 Drawing Sheet

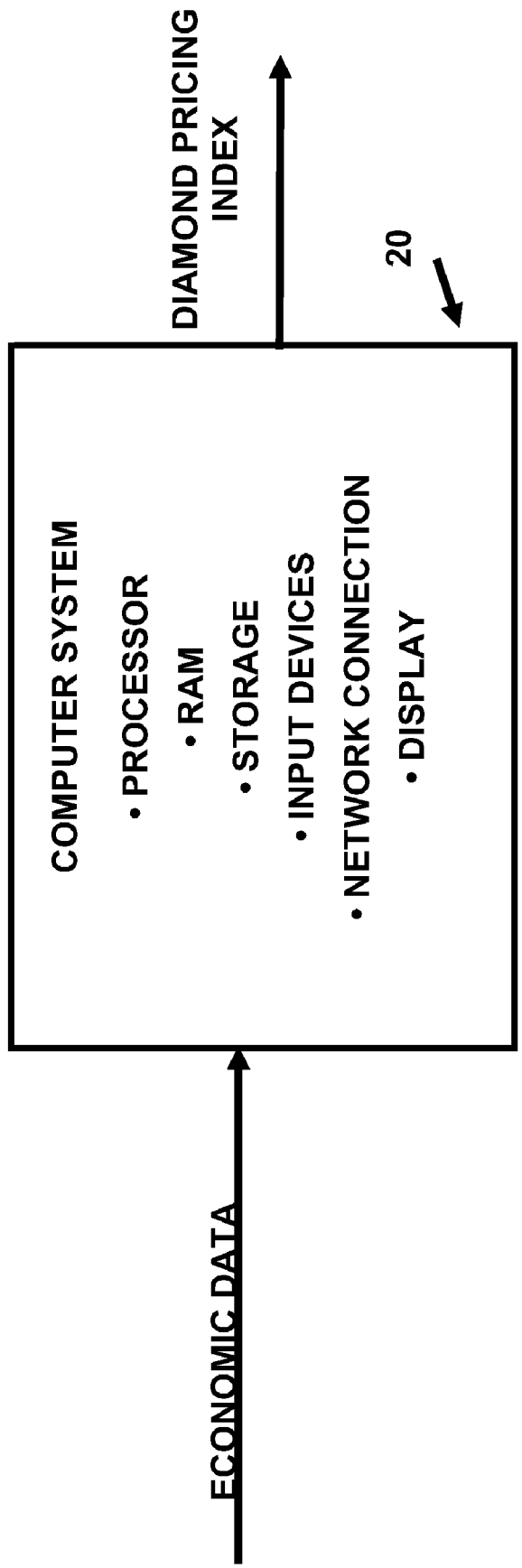

ESTABLISHING STANDARDIZED DIAMOND PROFILES AND PRICING

FIELD OF THE INVENTION

This invention generally pertains to a system and method for establishing standardized diamond profiles for use in futures trading and the like.

BACKGROUND AND SUMMARY OF THE INVENTION

Trading in derivatives is often undertaken using futures or options contracts. Futures contracts, for example, are entered into with respect to many different assets or commodities, such as gold, platinum, and oil. Futures contracts are typically entered into as speculation on future market movements, or as "hedging" measures. For instance, the price of gold may presently be $900 per ounce, and a trader may enter into a futures contract to buy 100 ounces of gold at $905 per ounce in one month's time. The trader does this in the hope that the price of gold will rise in that time. If, at the end of the month, the price of gold is $910 per ounce, the trader will be in a position to profit by $5 per ounce of gold, i.e. $500 in total.

A futures contract will normally be entered into with an investment bank or other securities trading entity. In order for both parties to the contract to be satisfied that the result is equitable, there must be for the underlying asset of the contract an index or other price metric on which both parties agree. At present, futures contracts cannot be bought for diamonds. The principal reason for this is that diamonds are not fungible, whereas a certain quantity of gold or oil may be, for all intents and purposes, the same as another quantity of gold or oil. Therefore, a futures contract can deal with merely a quantity of gold or oil. On the other hand, diamonds are individually classified by a number of parameters in addition to weight (carats), and those other parameters (such as color) are variable across diamonds of the same weight and significant factors in setting prices for diamonds.

The present invention is directed to a system for establishing diamond profiles that are useful for pricing diamonds in a standardized way to thereby make diamonds amenable as commodities or assets for derivative trading via futures contracts or the like.

Another aspect of the present invention provides a computer program comprising computer program code, or code adapted to perform all the steps of establishing diamond profiles when said program is run on a computer.

Preferably, the computer program is embodied on a computer readable medium.

Other features and advantages of the present invention will become evident upon a review of the entire specification, drawings, and claims of this application.

BRIEF DESCRIPTION OF THE DRAWINGS

FIG. 1 is a diagram of a computer-based system for establishing standardized diamond profiles in accord with the present invention.

DETAILED DESCRIPTION OF A PREFERRED EMBODIMENT

One programmable computer-based system 20 for establishing standardized diamond profiles and pricing for use in futures trading and the like is depicted in the diagram of FIG. 1. The system 20 may be a stand-alone, workstation, a networked device sharing resources across two or more machines, such as a client computer connectable to a server via the Internet.

The resources of the computer system 20 include a central processor unit or simply, "processor;" volatile memory known as random access memory or RAM; storage capability in the form of any of a variety of media such as hard drive(s); user input devices; local and wide-area network connections, and a display. The term "display" is intended here in a very general sense to mean any of a variety of devices for providing human-perceptible information via electronic display, printer, and/or speaker.

With continued reference to FIG. 1, the computer system is programmed in order to receive, as through a network connection, selected economic data as discussed more below. This data is processed, as will be described, to develop, among other things, a standard index for trading diamonds. The index relates to a specific profile that corresponds to a set of parameters that are used for characterizing diamonds, those parameters include: weight, cut, color, and clarity. Trading diamonds via futures contracts or the like demands an index or other price metric on which both parties to a futures contract have sufficient confidence that such a metric is neither arbitrary, nor assigned in a way that is not transparent to both parties.

In accord with the present invention, the index is developed by first creating and storing a standard diamond profile (discussed next), acquiring selected economic data, and processing that data to generate the index that is based upon the standard profile.

In one embodiment of the present invention the standard diamond profile corresponds to a large diamond having the highest available quality, which is quantified in terms of the parameters weight, cut, color, and clarity. Before further describing that profile, however, these conventional parameters are reviewed.

Diamond weights are measured in "carats." One carat equals 200 milligrams. There are 5 carats in 1 gram.

By convention in the current trade, the shapes of diamonds include round, marquise, pear, oval, emerald, princess, radiant, and heart. Round diamonds are typically proportioned to reflect back (rather than leak) all of the light impinging upon it and, therefore, such round diamonds are often referred to as "brilliant." The "cut" of a diamond refers to the way in which it is polished and finished. A diamond may be given a "finish" or "finish grade" which ranges from "excellent", at the top end of the scale, to "poor" at the lower end of the scale. The proportions of a diamond may also be graded, from "excellent" at the top end of the scale to "unusual" at the lower end of the scale.

A diamond's color parameter may range from perfectly colorless to having a noticeable tint of yellow or brown or gray or combinations of these colors. A descending alphabetical grading scheme is employed such that the perfectly colorless stone is graded "D" and the most heavily tinted being graded as "Z." The range of colors from grade "D" to "N" are generally considered to be the most attractive and sought-after, with "D" color being the most valuable under presently accepted diamond grading procedures.

The diamond's clarity grade refers to the extent of internal flaws or "inclusions" that can affect the appearance and, in some instances, strength of the diamond. The following is a list of clarity grades and attendant explanations, in order of value, with the most valuable being FL (flawless):

FL=Flawless: No internal or external inclusions being visible under 10× magnification.

IF=Internally Flawless. No internal inclusions being visible under 10× magnification.
VVS1=Very Very Slightly Included 1. Typically just a single tiny inclusion visible under 10× magnification.
VVS2=Very Very Slightly Included 2. Tiny inclusions visible under 10× magnification.
VS1=Very Slightly Included 1. Very small inclusions visible with 10× magnification.
VS2=Very Slightly Included 2. Several very small inclusions visible with 10× magnification.
SI1=Slightly Included 1. Small inclusions visible with 10× magnification.
SI2=Slightly Included 2. Several small inclusions visible with 10× magnification.
SI3=Slightly Included 3. Inclusions that may be visible to the naked eye.
I1=Included 1. Flaws that are visible to the naked eye.

The standard diamond profile (SDP) for the present embodiment of the invention is selected to have the following set of parameters: weight=10.00 carats; shape=round; cut=brilliant; clarity=FL; proportions=excellent; finish=excellent; fluorescence=none; and color=D. The technique for assigning a price or index to the selected SDP, discussed next, generally avoids the problem of attempting to price diamonds based only on conventional diamond industry information that may have limited availability and reliability.

As an alternative embodiment, the standard diamond profile may be selected to account for possible future changes in the parameters applied for characterizing diamonds, which changes could make the overall parameters more stringent than those currently applied. Accordingly, the alternative profile may be established as having a "D+" color (reflecting a diamond having a color superior to the current "D" color) and having a flawlessness of, for example, "F+" which can be established as a diamond displaying no inclusions under magnification greater than 10× (for example flawlessness as measured under twenty times magnification rather than the current highest standard of ten times magnification).

In accordance with the present invention, the index based upon the SDP (hereafter referred to as the SDP index or SDPI) is a function of economic data that is readily and reliably discernable from well established published sources. In one example, the SDP index is made a function of the pricing of commodities, other than diamonds, on the assumption that diamond pricing changes will relate to, or can be modeled by, changes that occur in the prices of other commodities. Also, the pricing of such commodities, such as precious metals, is indisputably established by reliable sources of public information such as, for example, Reuters information services.

In one example the SDP index is made a function of the market prices for the commodities of gold, platinum, silver, palladium and oil. In one embodiment, the prices are evenly weighted, and a coefficient is applied for scaling the resulting aggregate of the selected commodity prices to that of the SDP, such that the SDP index (SDPI) is denoted as:

$$SDPI = K^*(1.0^*Pg + 1.0^*Ppl + 1.0^*Ps + 1.0^*Ppa + 1.0^*Po); \quad \text{EQ. 1.}$$

where K=scaling coefficient; Pg=market price for an ounce of gold; Ppl=market price for an ounce of platinum; Ps=market price for an ounce of silver; and Ppa=market price for an ounce of palladium; Po=market price for one barrel of oil; all price units in dollars.

In this embodiment, the coefficient "K" is established to be 465. The market prices of the remaining commodities are updated by the computer system 20, which collects the data via access to an appropriate reliable public source of such economic data. That data (market price of gold, etc) is then processed to calculate the SDPI as follows (using exemplary market prices in equation 1 above):

$$SDPI = 465^*(1.0^*900 + 1.0^*2200 + 1.0^*50 + 1.0^*450 + 1.0^*130) = \$1,734,450.00.$$

It will be appreciated that although the foregoing numeric function and exemplary calculation are provided to explain the SDP index, other functions are contemplated. For example, simple trial and error may reveal that actual prices of diamonds may be more sensitive to, or move in closer relation to, changes in the price of one commodity (such as gold) as compared to another (such a oil). Accordingly, rather than the even weighting appearing in equation 1 above, (that is, each commodity given a weighting coefficient of 1.0), the commodities could be weighted differently to reflect that sensitivity.

Moreover, the SDP index need not be made a function of the five commodities noted above. For example, the index could rely solely on precious metals including the set, or a subset of, those discussed above. Other metals, such as titanium, may be included.

It is contemplated that the system operation may choose to update the function underlying the SDP index from time to time to adjust, for example, the weighting or scaling coefficients, so that the function more accurately reflects the correlation between value movements in the particular economic data (such as precious metals pricing) and that of diamond prices. Such updating would be in accord with a schedule that is announced well in advance so that those relying on the index could take into consideration the effect of the update on any futures or options contracts trading, for example.

After the SDP index of the standard diamond profile (SDP) is calculated and stored, the method of the present invention (carried out by the above described computer system 20) provides for publication and repeated updating of the SDP index, thereby to enable futures contract pricing.

It is also contemplated that the system may combine two or more different diamond profiles to arrive at the standard diamond profile. To this end, the system of the present invention is configured for calculating the SDP index using economic data and functions as described above, as well as separately calculating a second SDP index relating to a diamond having different set of parameters (for example, a different color). The system then extrapolates from those two indices a third index to serve as the actual SDP index that is stored and published for use in futures trading.

Regardless of what parameter set is selected as that for the profile of the standard diamond, the technique for establishing the SDPI remains as described above, relying on economic data that is readily and reliably discernable from well established public sources, thereby making diamonds amenable to derivative trading vehicles such as futures or options contracts.

To implement derivatives trading based upon the standardized diamond profile index, it is envisaged that a private exchange may be set up. This exchange may preferably be a "virtual exchange" but may alternatively, or in addition, comprise one or more physical locations. The exchange would manage transactions between buyers and sellers, based on the prices of the indices relating to the standardized diamond profiles, as discussed above.

It is envisaged that the exchange will be privately owned. Entities who wish to trade through the exchange, such as banks and individual traders, may be required to become members of the exchange in order to do so and may be charged for membership, and the exchange may also require fees to be paid as trading progresses, for instance, a certain percentage of funds which are paid out when derivatives contracts are concluded.

While the above description relates solely to diamonds, it should be understood that the system may be applied equally to any other precious stones. For instance, any or all of rubies, emeralds and sapphires may be used instead of, or as well as, diamonds.

While the foregoing description was made in the context of a preferred embodiment, it is contemplated that modifications to that embodiment may be made without departure from the invention as claimed.

The invention claimed is:

1. A system for establishing a standardized diamond profile index for use in trading and the like, comprising:
    computing means for
        storing a standard diamond profile, the profile comprising a selected set of parameters for characterizing diamonds;
        collecting economic data that relate to a plurality of commodities other than diamonds;
        calculating a standard diamond profile index as a function of the economic data,
        wherein the index is established as a monetary value of a diamond meeting the parameters of the standard diamond profile, and
        wherein the calculating step includes multiplying by a scaling coefficient the summed, weighted market prices for each of the plurality of commodities other than diamonds; and
    display means associated with the computing means for outputting the standard diamond profile index for use by traders.

2. The system of claim 1 wherein the computing means collects as economic data market prices of one or more of precious metals.

3. The system of claim 1 wherein the computing means collects as economic data a market price of oil.

4. The system of claim 1 wherein the computing means collects as economic data a selected combination of: market prices of one or more precious metals and the market price of oil.

5. The system of claim 1 including storage means associated with the computing means for storing the standard diamond profile index.

6. The system of claim 1 wherein the selected set of parameters for characterizing diamonds includes cut, weight, color, and clarity.

7. The system of claim 6 wherein the standard diamond profile includes brilliant cut, 10-carat weight, "D" color, and flawless clarity.

8. The system of claim 1 wherein the selected set of parameters for characterizing diamonds includes a clarity parameter denoting the absence of inclusions under magnification greater than ten times.

9. The system of claim 1 wherein the standard diamond profile comprises a selected set of parameters relating to a single diamond.

10. The system of claim 1 wherein the standard diamond profile comprises a selected set of parameters relating to two different diamonds.

11. The system of claim 1 wherein the standard diamond profile comprises a selected set of parameters relating to two diamonds that have matching sets of parameters for characterizing diamonds except for a parameter relating to color.

12. A system for establishing a standardized precious stone profile index for use in trading and the like, comprising:
    computing means for
        storing a standard precious stone profile, the profile comprising a selected set of parameters for characterizing precious stones;
        collecting economic data that relate to a plurality of commodities other than precious stones;
        calculating a standard precious stone profile index as a function of the economic data,
        wherein the index is established as a monetary value of a precious stone meeting the parameters of the standard precious stone profile, and
        wherein the calculating step includes multiplying by a scaling coefficient the summed, weighted market prices for each of the plurality of commodities other than precious stones; and
    display means associated with the computing means for outputting the standard precious stone profile index for use by traders.

13. The system of claim 12 wherein the computing means collects as economic data market prices of one or more of precious metals.

14. The system of claim 12 wherein the computing means collects as economic data a market price of oil.

15. The system of claim 12 wherein the computing means collects as economic data a selected combination of: market prices of one or more precious metals and the market price of oil.

16. The system of claim 12 including storage means associated with the computing means for storing the standard precious stone profile index.

17. The method of claim 1 wherein the calculating step includes calculating a standard diamond profile index for diamonds having the selected set of parameters.

18. The method of claim 1 wherein the calculating step includes calculating a standard precious stone profile index for precious stones having the selected set of parameters.

* * * * *